(12) United States Patent
Kawabe et al.

(10) Patent No.: US 11,332,586 B2
(45) Date of Patent: May 17, 2022

(54) QUASI-ISOTROPIC REINFORCED SHEET MATERIAL AND PRODUCTION METHOD THEREOF

(71) Applicant: FUKUI PREFECTURAL GOVERNMENT, Fukui (JP)

(72) Inventors: Kazumasa Kawabe, Fukui (JP); Keiichi Kondo, Fukui (JP); Hirofumi Iyo, Fukui (JP)

(73) Assignee: FUKUI PREFECTURAL GOVERNMENT, Fukui (JP)

( * ) Notice: Subject to any disclaimer, the term of this patent is extended or adjusted under 35 U.S.C. 154(b) by 384 days.

(21) Appl. No.: 15/324,008

(22) PCT Filed: Jul. 3, 2015

(86) PCT No.: PCT/JP2015/069251
§ 371 (c)(1),
(2) Date: Jan. 5, 2017

(87) PCT Pub. No.: WO2016/006543
PCT Pub. Date: Jan. 14, 2016

(65) Prior Publication Data
US 2017/0183465 A1    Jun. 29, 2017

(30) Foreign Application Priority Data

Jul. 8, 2014 (JP) .............................. JP2014-140660
Jun. 24, 2015 (JP) .............................. JP2015-126500

(51) Int. Cl.
*C08J 5/24* (2006.01)
*C08J 5/04* (2006.01)
(Continued)

(52) U.S. Cl.
CPC ................ *C08J 5/24* (2013.01); *B29B 11/16* (2013.01); *C08J 5/04* (2013.01); *C08J 5/042* (2013.01);
(Continued)

(58) Field of Classification Search
CPC ....... C08J 5/04; C08J 5/042; C08J 5/24; C08J 5/043; B29B 11/16; B32B 3/00;
(Continued)

(56) References Cited

U.S. PATENT DOCUMENTS 5,151,322 A * 9/1992 Kimoto ............... B29C 45/0005
428/299.1
2007/0267775 A1 * 11/2007 Ellis ........................ B32B 27/12
264/240
(Continued)

FOREIGN PATENT DOCUMENTS

EP    0 376 472 A2    7/1990
EP    2 151 418 A1    2/2010
(Continued)

OTHER PUBLICATIONS

International Search Report for PCT/JP2015/069251 dated Oct. 6, 2015 [PCT/ISA/210].
(Continued)

*Primary Examiner* — Matthew D Matzek
(74) *Attorney, Agent, or Firm* — Sughrue Mion, PLLC

(57) ABSTRACT

A quasi-isotropic reinforced sheet material T formed by integrating a plurality of chopped semi prepreg sheet materials C including a reinforced fiber material and a thermoplastic resin material set in an unimpregnated state such that fiber directions of the reinforced fiber materials are oriented randomly in the two-dimensional direction. The average number of fibers in a thickness direction for materials C ranges is from two to ten and a thickness "t", relative to the
(Continued)

thickness ($t_p$) in an impregnated state, is in a range of $t_p < t \leq 2 \times t_p$. A layered body M is obtained by bonding and integrating the materials C in a state where fiber directions of the reinforced fiber materials are oriented randomly in a two-dimensional direction and the materials C overlap such that the average number of the materials C in the thickness direction is set in a range from two to ten.

13 Claims, 3 Drawing Sheets

(51) Int. Cl.
| | |
|---|---|
| *B29B 11/16* | (2006.01) |
| *B32B 5/02* | (2006.01) |
| *B32B 5/22* | (2006.01) |
| *B32B 9/00* | (2006.01) |
| *B32B 5/16* | (2006.01) |
| *B29K 77/00* | (2006.01) |
| *B29K 307/04* | (2006.01) |

(52) U.S. Cl.
CPC ...... *B29K 2077/00* (2013.01); *B29K 2307/04* (2013.01); *B32B 5/022* (2013.01); *B32B 5/16* (2013.01); *B32B 5/22* (2013.01); *B32B 9/007* (2013.01); *B32B 2250/20* (2013.01); *B32B 2260/00* (2013.01); *B32B 2305/28* (2013.01); *B32B 2307/50* (2013.01); *B32B 2307/514* (2013.01); *B32B 2307/70* (2013.01); *B32B 2307/708* (2013.01); *C08J 2377/02* (2013.01)

(58) Field of Classification Search
CPC ......... B32B 3/26; B32B 3/30; B32B 5/00–02; B32B 5/022; B32B 5/16; B32B 5/22; B32B 9/007; B32B 2250/00–05; B32B 2250/20; B32B 2260/00; B32B 2262/101; B32B 2262/106; B32B 2305/22; B32B 2305/28; B32B 2307/50; B32B 2307/70; B32B 2307/514; B32B 2307/708
USPC ............... 428/297.4, 297.7, 267.4, 304.4; 442/394–399, 76, 77, 172, 178–180
See application file for complete search history.

(56) References Cited

U.S. PATENT DOCUMENTS

| | | | | |
|---|---|---|---|---|
| 2010/0178495 | A1* | 7/2010 | Taketa | ............... B29C 70/14 428/339 |
| 2011/0143110 | A1* | 6/2011 | Tsuchiya | ............ B29C 70/08 428/213 |
| 2014/0077412 | A1* | 3/2014 | Taniguchi | ........... B29C 70/46 264/257 |

FOREIGN PATENT DOCUMENTS

| | | |
|---|---|---|
| JP | 2007-262360 A | 10/2007 |
| JP | 2015/069251 A | 10/2015 |

OTHER PUBLICATIONS

Communication dated Feb. 9, 2018 from the European Patent Office in counterpart application No. 15818313.7.

\* cited by examiner

FIG. 5
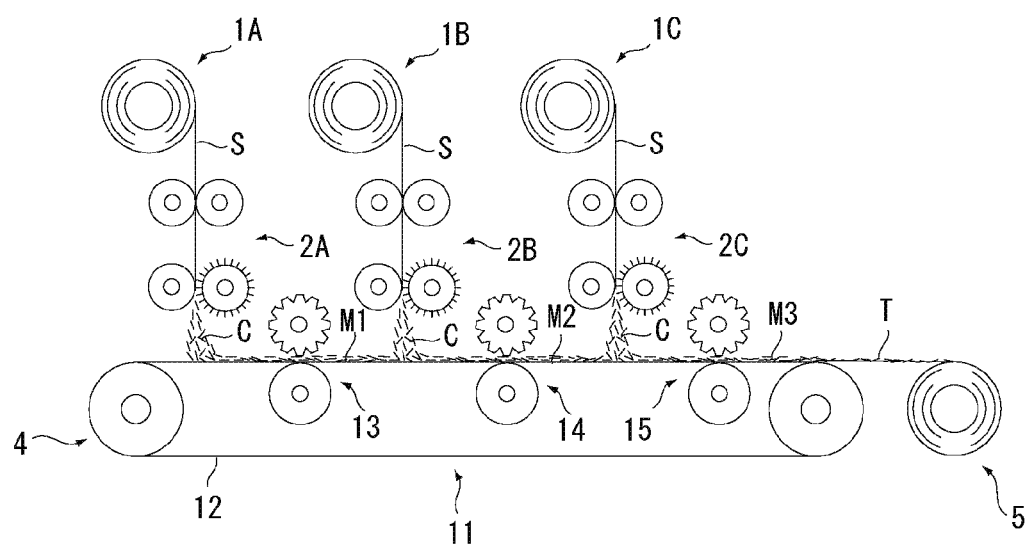
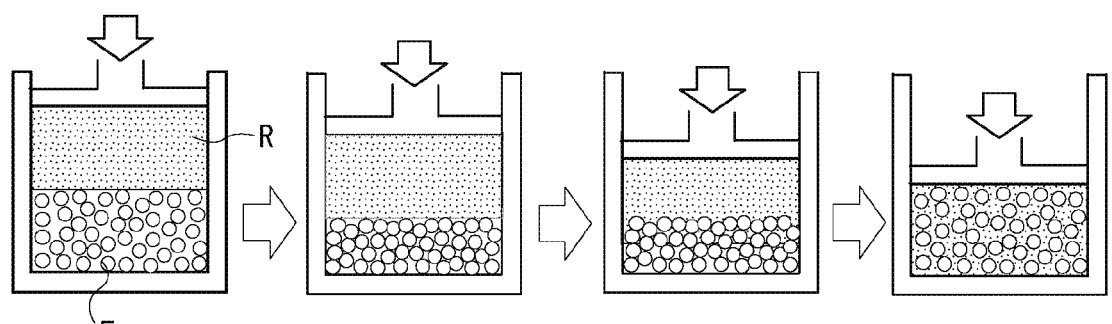
FIG. 6(a)  FIG. 6(b)  FIG. 6(c)  FIG. 6(d)

QUASI-ISOTROPIC REINFORCED SHEET MATERIAL AND PRODUCTION METHOD THEREOF

CROSS REFERENCE TO RELATED APPLICATIONS

This application is a National Stage of International Application No. PCT/JP2015/069251, filed on Jul. 3, 2015, which claims priority from Japanese Patent Application Nos. 2014-140660, filed on Jul. 8, 2014, and 2015-126500, filed on Jun. 24, 2015, the contents of all of which are incorporated herein by reference in their entirety.

TECHNICAL FIELD

The present invention relates to composite materials including reinforced fibers and thermoplastic resin and, more specifically, to a quasi-isotropic reinforced sheet material and a production method thereof. The quasi-isotropic reinforced sheet material is obtained by laminating and integrating chopped semi prepreg sheet materials such that fiber directions thereof are oriented randomly is two-dimensional direction. The chopped semi prepreg sheet materials are obtained by compounding reinforced fibers such as carbon fibers or glass fibers and thermoplastic resin such as polypropylene resin, polyamide resin, and polyetherimide resin.

BACKGROUND ART

A fiber reinforced composite material is obtained by combining a reinforced fiber material and resin material, which becomes a matrix. The fiber reinforced composite material is light and has a high rigidity, and thus various types of functional designs can be performed. Therefore, it can be used in a wide variety of fields such as an aerospace field, a transportation field, an engineering construction field, and an exercise equipment field.

A various kinds of molding methods on a fiber reinforced composite material are suggested. The fiber reinforced composite material is obtained by compounding reinforced fibers such as carbon fibers or glass fibers, and thermoplastic resin such as polypropylene resin, polyamide resin, and polyetherimide resin. In such a molding method, in order to make the most of a property of the reinforced fibers, it is preferable that the reinforced fiber be used in a long-fiber form. More specifically, a material (e.g., a one-directional reinforced sheet material in which the reinforced fibers are aligned in one direction or woven cloth woven with the one-directional reinforced sheet materials) is used in which reinforced fibers in a long-fiber form are aligned in a sheet-like shape. Then, the thermoplastic resin is impregnated into the material in a sheet-like shape to produce a prepreg sheet. The prepreg sheets are laminated in various directions depending on design to produce a laminated product. Subsequently, the laminated product is heated and pressurized to be molded into a desired shape so as to obtain a molding product, which is a typical molding method.

However, in such a molding method, an apparatus for laminating the prepreg sheet materials in the various directions costs high. Further, a laminating process may need much time for some sizes of molding product. Therefore, the obtained molding product has excellent mechanical properties, but since much time is needed to obtain one molding product, a production cost becomes high. The molding method described above is suitable for producing the molding products in which the mechanical properties are required to provide high accuracy and reliability, such as aerospace-related members. However, when the molding products in fields of vehicles, mechanic components, construction-related members, and the like, are produced, since the production cost needs to be reduced, the molding method may not be suitable.

As the molding method with adaptability to a shape of the molding product to obtain relatively inexpensive molding products, for example, a method is suggested for obtaining the molding products using a quasi-isotropic reinforced sheet material produced by orientating the chopped prepreg sheet material in a quasi-isotropic state. The chopped prepreg sheet material has a desired width and length, and the thermoplastic resin is impregnated into the bundle of the fibers of the chopped prepreg sheet material. Such a method is advantageous in that, since the fibers are not continuous, fluidity of the fibers is improved at molding, and the molding product in a complicated shape can be formed in a relatively short time. Patent Literature 1 describes, as a quasi-isotropic reinforced sheet material having mechanical property and excellent uniformity, for example, a fiber reinforced thermoplastic resin sheet obtained by laminating chopped strand prepreg having a desired length 15 to 100 mm) and a thickness (0.13 mm or less) in a sheet-like shape such that its fiber orientation is random in the two dimension, and integrating them via point welding.

FIGS. 6(a)-6(d) describe a basic process of molding in which the resin material is impregnated into a bundle of the reinforced fibers to make composite materials. A symbol of "o" indicates a sectional view of the reinforced fiber, and a hatching part indicates the resin material. As described in Non Patent Literature 1, it is considered that, when the bundle of the reinforced fibers and the resin material are set in a pressurized state (FIG. 6(a)), in molding processing, being roughly divided, three processes proceed. The three processes include intimate contact (FIG. 6(b))→impregnation (FIG. 6(c))→fusion (FIG. 6(d)).

When the bundle of the reinforced fibers and the resin material are pressurized, firstly, as illustrated in FIG. 6(b), the intimate contact process is performed in which the bundle of the reinforced fibers are compressed with pressure. It is considered that, if there is a large void in the bundle of the reinforced fibers, the reinforced fibers are pressed into the void to make a state where the reinforced fibers get closer to each other. Subsequently, when the intimate contact reaches a predetermined level, impregnation processing is performed in which melted resin material gets into the void in the fibers with the pressure. Further, the resin material infiltrates the bundle of the reinforced fibers, and at a stage where the resin material infiltrates all over the bundle of the reinforced fibers, the impregnation process of the resin material is completed. After the impregnation process of the resin material has been completed, a fusion process is performed in which each reinforced fiber is realigned in the resin material impregnating all over and spreads uniformly into the resin material so that the fibers disperse into the resin.

Focused on the impregnation process of the resin material into the bundle of the reinforced fibers, when a state where the resin material infiltrates all over the bundle of the reinforced fibers is designated as an impregnated state, in a previous stage of the impregnated state, there exists an unimpregnated state where the resin material partially infiltrates the bundle of the reinforced fibers and has not yet completely done all over. In the unimpregnated state, a part partially exists where the resin material has not infiltrated but converged in the bundle of the reinforced fibers, and also a resin part partially exists where the resin material has not infiltrated the bundle of the reinforced fibers. It is considered that the conventional prepreg sheet material as described in Patent Literature 1 goes through the fusion process as illustrated in FIG. 6(c), and is set in a state where the resin infiltrates the bundle of the reinforced fibers and the fibers disperse into the resin.

CITATION LIST

Patent Literature

PTL 1: Japanese Patent Laid-Open No. 2007-262360

Non Patent Literature

NPL 1: Kazumasa Kawabe et. al., "thermoplastic resin impregnation simulation for developing thermoplastic resin prepreg apparatus" Fukui Prefecture Industrial Technology Center, 2000 Search Report No. 17

SUMMARY OF INVENTION

Technical Problem

The chopped prepreg sheet material used for the conventional molding method is produced by chopping, in the desired width and length, the prepreg sheet material in which the thermoplastic resin is in the impregnated state in the bundle of the reinforced fibers such as, normally, carbon fiber bundles. Since the thermoplastic resin has high viscosity in a melting state, the prepreg sheet material in which the thermoplastic resin is set in the impregnated state in advance is used. By use of such a prepreg sheet material, the final molding product without void and with excellent quality can be stably produced.

On the other hand, since the conventional chopped prepreg sheet material in which the thermoplastic resin is set in the impregnated state in the bundle of the reinforced fibers is in a state where the thermoplastic resin infiltrates all over the reinforced fiber bundle, its rigidity is high. More specifically, the chopped prepreg sheet material becomes like a plate-like body having poor flexibility when a thickness of the sheet is 0.1 mm or more. As described in Patent Literature 1, when the chopped prepreg sheet materials are dispersed to be laminated and point-welded, it is difficult for overlapped sheet materials to closely contact with each other and, thus, the point welding tends to be insufficient. Therefore, after the point welding is performed, the chopped prepreg sheet material may fall off. In order to prevent the fall off, it is considered that the point welding be performed at many places to firmly weld the chopped prepreg sheet material. However, the rigidity of the fiber reinforcement thermoplastic resin sheet obtained after the point welding is performed is increased and, thus, a drape property is deteriorated to make it hard to handle the fiber reinforcement thermoplastic resin sheet at the molding.

The above described quasi-isotropic reinforced sheet material is formed by overlapping one or more chopped prepreg sheet materials to have a desired thickness, and it is an intermediate material for performing the molding by heating and pressurizing to obtain the molding product finally. Therefore, if a produced quasi-isotropic reinforced sheet material can be wound in a roiled shape to handle, the molding product having a preferable quality can be produced efficiently. In other words, by use of the quasi-isotropic reinforced sheet material wound in a rolled shape, a step of unwinding the quasi-isotropic reinforced sheet material by a desired length, a step of chopping it in a desired size, and a step of producing a laminated product by laminating the chopped sheets can be easily automated so that improvement of productivity and reduction of the production cost can be expected.

However, as described above, when the quasi-isotropic reinforced sheet material includes the fiber reinforcement thermoplastic resin sheet having the high rigidity and almost no drape property, conveying in a state where it is wound in a rolled shape difficult. Thus, conveying as a chopped product in a plate-like shape cannot be avoided, and also deterioration of handling performance and productivity cannot be avoided.

Further, the chopped prepreg sheet material becomes flexible as it becomes thinner. However, when the chopped prepreg sheet material is used in which the thermoplastic resin is set in the impregnated state in the bundle of the reinforced fibers aligned in one direction, as it becomes thinner and as content rate of the resin becomes smaller, a crack can be easily generated in a fiber direction. In other words, in the impregnated state where the thermoplastic resin has infiltrated all over the bundle of the reinforced fibers, the thermoplastic resin gets in between the reinforced fiber and the reinforced fiber. If the chopped prepreg sheet material is thin, even a small shock can easily separate it to cause the crack.

For example, the prepreg sheet material (thickness 50 μm and fiber volume fraction 50%) in which the polyamide 6 resin (PA6) is set in the impregnated state in a bundle of carbon fibers aligned in one direction is chopped in a direction orthogonal to the fiber, the shock at the chopping has caused many cracks in the fiber direction. In other words, it is difficult to produce many chopped prepreg sheet materials having an excellent quality in a short time using the prepreg sheet material having a thickness of 0.1 mm or less and a high fiber volume fraction. Further, when the obtained chopped prepreg sheet materials are dispersed, the shock is applied to the chopped prepreg sheet materials to split it, thus making their width smaller. There is a problem that the quasi-isotropic reinforced sheet material in which there is a mixed chopped prepreg sheet material having the different width, which is different from the design described above, has uneven dynamic property different from the design so that the sheet material having a stable quality can be hardly obtained.

On the other hand, as to the dynamic property of the quasi-isotropic laminated plate obtained by laminating thin one-directional reinforced prepreg sheet materials, preferable data is obtained (S. Shin, R. Y. Kim, K. Kawabe, Stephen W. Tsai, "Experimental studies of thin-ply laminated composites", Composite Science and Technology Vol. 67, pp. 996-1008, 2007.) From the results described above, also as to the quasi-isotropic reinforced sheet material using thin chopped prepreg sheet materials, improvement of the dynamic property is expected. However, when the thin chopped prepreg sheet materials are used, in a state where the chopped prepreg sheet materials are laminated, they are easily impacted by adjacent other chopped prepreg sheet materials. For example, when the quasi-isotropic reinforced sheet material is heated and pressurized to be molded, the chopped prepreg sheet material flows. However, since the chopped prepreg sheet materials come into contact with each other differently, the fluidity is deteriorated and becomes uneven as a whole. Therefore, the quality of the obtained molding product may not be uniform.

Further, when a molding member having a desired thickness is to be obtained using the thin chopped prepreg sheet materials, the greater number of the thin chopped prepreg sheet materials are needed for laminating than that of the thick chopped prepreg sheet materials. For example, when the molding member having the thickness 2 mm is to be obtained, the number of laminated chopped sheet materials each having the thickness 40 μm is fifty on average, which is almost three times more than that of the chopped sheet materials each having the thickness 120 μm. As described in Patent Literature 1, if the number of laminated sheet materials is increased in the thickness direction, the chopped sheet materials can be easily aligned such that the fiber directions of the chopped sheet materials evenly vary from each other, thereby improving the quasi-isotropic property of the obtained reinforced sheet materials.

However, when fifty chopped sheet materials are laminated in the thickness direction, it is very difficult to orientate and laminate the chopped sheet materials so as to evenly vary the fiber directions from each other. If the chopped sheet materials are deflected and orientated in similar directions to be laminated, no effects of using the thin chopped sheet materials are obtained. Further, unevenness of the number of laminated sheet materials can be easily generated. When the molding is performed in a state where the orientation at the lamination and the number of laminated sheet materials are uneven, the fluidity of the chopped sheet material is not uniform, which may cause deterioration and unevenness of the dynamic property of the obtained molding member.

Accordingly, the present invention is directed to provide the quasi-isotropic reinforced sheet material, with which the molding member capable of realizing preferable flexibility and fluidity at the molding using the thin chopped semi prepreg sheet materials, and having the excellent dynamic property can be obtained, and the production method thereof.

Solution to Problem

A quasi-isotropic reinforced sheet material according to the present invention is a quasi-isotropic reinforced sheet material that is substantially formed by integrating a plurality of chopped semi prepreg sheet materials including a reinforced fiber material and a thermoplastic resin material set in an unimpregnated state, the chopped semi prepreg sheet materials each having the average number of fibers in a thickness direction set in a range from two to ten and also a thickness "t" set, relative to the thickness ($t_p$) in an impregnated state, in a range of $t_p < t \leq 2 \times t_p$, the quasi-isotropic reinforced sheet material including a layered body obtained by bonding and integrating the plurality of chopped semi prepreg sheet materials in a state where fiber directions of the reinforced fiber materials are oriented randomly in a two-dimensional direction and also the plurality of chopped semi prepreg sheet materials is overlapped with each other such that the average number of the chopped semi prepreg sheet materials in the thickness direction is set in a range from two to ten Further, the chopped semi prepreg sheet materials each have a fiber volume fraction in the impregnated state set in a range from 30% to 70%. Furthermore, the chopped semi prepreg sheet materials are partially bonded to each other by heat sealing of the thermoplastic resin material. Moreover, a plurality of the layered bodies is laminated and integrated. Further, in the layered bodies, bonding conditions of the chopped semi prepreg sheet materials are different from each other. Furthermore, a resin layer part is formed at least partially between the adjacent layered bodies.

A production method of a quasi-isotropic reinforced sheet material according to the present invention is a production method of a quasi-isotropic reinforced sheet material using a semi prepreg sheet material that includes a reinforced fiber material and a thermoplastic resin material set in an unimpregnated state, the method including: a chopping step of chopping the semi prepreg sheet material in a required width and length to form chopped semi prepreg sheet materials, the semi prepreg sheet material having the average number of fibers in a thickness direction set in a range from two to ten, and also a thickness "t" set, relative to the thickness ($t_p$) in an impregnated state, in a range of $t_p < t \leq 2 \times t_p$; and an integrating step of bonding and integrating a plurality of the chopped semi prepreg sheet materials to form a layered body in a state where fiber directions of the reinforced fiber materials are oriented randomly in a two-dimensional direction, and also the plurality of chopped semi prepreg sheet materials is overlapped with each other such that the average number of the chopped semi prepreg sheet materials in the thickness direction is set in a range from two to ten. Further, the semi prepreg sheet material has a fiber volume fraction in the impregnated state set in a range from 30% to 70%. Furthermore, the integrating step forms the layered body by overlapping the chopped semi prepreg sheet materials with each other and partially bonding them to each other by heat sealing of the thermoplastic resin material. Moreover, the integrating step laminates and integrates a plurality of the layered bodies. Further, the integrating step sequentially laminates and integrates the plurality of the layered bodies by overlapping, on the formed layered body, the chopped semi prepreg sheet materials with each other such that the fiber directions of the reinforced fiber materials are oriented randomly in the two-dimensional direction, to form the subsequent layered body. Furthermore, the integrating step laminates and integrates the layered bodies by arranging resin materials in a layered state at least partially between the adjacent layered bodies.

Advantageous Effects of Invention

The quasi-isotropic reinforced sheet material according to the present invention has the above described configuration to realize preferable flexibility and fluidity at the molding using the thin chopped semi prepreg sheet material, thereby obtaining the molding member having the excellent dynamic property.

BRIEF DESCRIPTION OF DRAWINGS

FIG. 5 is a schematic configuration view illustrating a modification of the production apparatus illustrated in FIG. 4.

FIG. 6(a), 6(b), 6(c) and 6(d) illustrate a basic molding process in which resin material is impregnated into the bundle of the reinforced fibers to give composite materials.

DESCRIPTION OF EMBODIMENTS

Figure 1A:
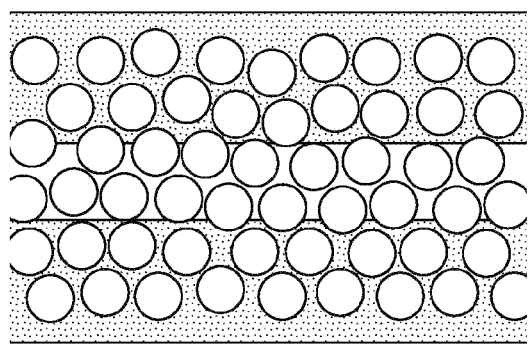
FIG. 1(a), 1(b) and 1(c) illustrate specific examples of an unimpregnated state.

Embodiments according to the present invention will be described in detail below. Note that, since the embodiment described below is a preferable specific example for implementing the present invention, various kinds of technical limitation are provided. However, as long as it has no particular description for limiting the present invention in the following description, the present invention is not limited to the embodiments described below.

The quasi-isotropic reinforced sheet material according to the present invention is formed by integrating a plurality of chopped semi prepreg sheet materials including the reinforced fiber material and the thermoplastic resin material set in the unimpregnated state such that the fiber directions of the reinforced fiber materials are oriented randomly in the two-dimensional direction. Since the fiber directions of the reinforced fiber materials are oriented randomly in the two-dimensional direction, the dynamic property in the two-dimensional direction has the quasi-isotropic property. Further, the quasi-isotropic reinforced sheet material includes one or more layered bodies in which the plurality of chopped semi prepreg sheet materials is integrated such that the fiber directions of the reinforced fiber materials are oriented randomly in the two-dimensional direction, and in which the average number of the chopped semi prepreg sheet materials in the thickness direction is set in the range from two to ten.

The quasi-isotropic reinforced sheet material maintains a form of the sheet material by integrating the chopped semi prepreg sheet materials in an overlapped state. If the sheet material is substantially formed with the chopped semi prepreg sheet material, the materials other than the above described chopped semi prepreg sheet material can be also mixed.

When the quasi-isotropic reinforced sheet material is obtained by laminating and integrating the layered bodies in a plurality of layers, the resin layer part may be arranged at least partially between the layered bodies adjacent to each other. The resin layer part may be formed in a layered state on all over or the part between the layered bodies. Inclusion of such a resin layer part makes it possible to adjust the fiber deposit content rate of the quasi-isotropic reinforced sheet material.

The chopped semi prepreg sheet material is produced by chopping, in the desired width and length, the semi prepreg sheet material in which the thermoplastic resin material is set in the unimpregnated state. The semi prepreg sheet material partially includes a part where the thermoplastic resin material is not infiltrated among the reinforced fiber materials but converged, and also a resin part that is not infiltrated between the reinforced fiber materials among the thermoplastic resin materials. Such a resin part exists and, thus, the chopped semi prepreg sheet material has the flexibility and also strength in which the chopped semi prepreg sheet material does not easily split in the fiber direction.

The reinforced fiber material used for the chopped semi prepreg sheet material includes a carbon fiber, a glass fiber, ceramic fiber, an aramid fiber, a PBO (polyparaphenylenebenzobisoxazole) fiber, inorganic fibers having high strength and high elasticity ratio used for FRP such as a metal fiber, organic fibers, or the like.

Further, the thermoplastic resin material used for the chopped semi prepreg sheet material is to be a matrix resin. As the thermoplastic resin material, polypropylene, polyethylene, polystyrene, polyamide (nylon 6, nylon 66, and nylon 12, etc.), polyacetal, polycarbonates, acrylonitrile-butadiene-styrene copolymers (ABS), polyethylene terephthalate, polybutyrene terephthalate, polyether imide, polyether sulfone, polyphenylene sulphide, polyether ketone, and polyether ether ketone, etc. are used. Furthermore, two or more kinds of the thermoplastic resins are mixed with each other to make the polymer alloy, which may be used as the matrix resin.

Figure 1B:
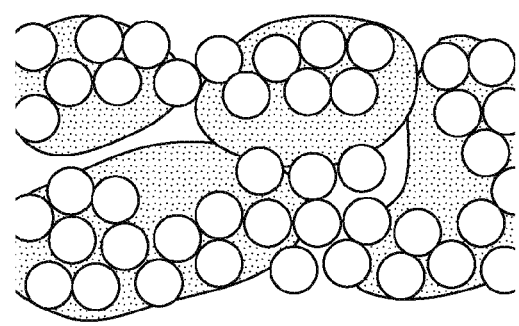
Figure 1C:
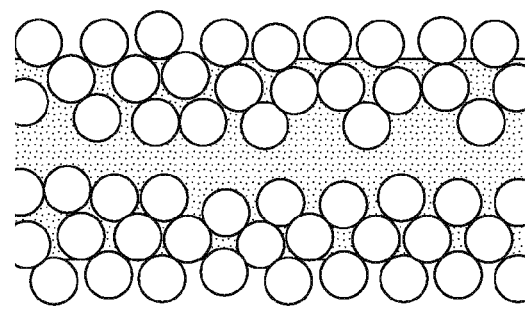

The semi prepreg sheet material is set in the unimpregnated state where the thermoplastic resin material has not completely infiltrated all over the reinforced fiber materials. FIG. 1(a) 1(c) illustrate the specific examples of the unimpregnated state. In FIG. 1(a)-1(c), the symbol of "o" indicates a cross section of the reinforced fiber material, and a part indicating with hatching illustrates the thermoplastic resin material.

In the example illustrating in FIG. 1(a), there are the thermoplastic resin materials in a sheet-like shape on both surfaces of the converged reinforced fiber materials, and a part of the thermoplastic resin material infiltrates between the reinforced fiber materials on a surface part. The thermoplastic resin material has not infiltrated between the reinforced fiber materials at a center part, but is kept in the converging state. A part of the thermoplastic resin material has not infiltrated yet also on both surface sides of the reinforced fiber materials. Such an unimpregnated state can be realized by heating and pressurizing the thermoplastic resin sheet material after it is abutted on both faces of the reinforced fiber bundle.

In the example illustrated in FIG. 1(b), there are the thermoplastic resin materials dispersing among the converged reinforced fiber materials, and the thermoplastic resin material is partially infiltrated between the reinforced fiber materials. Such an unimpregnated state can be realized by dispersing the thermoplastic resin material in a powder-like shape or a short-fiber-like shape between the reinforced fiber materials, then melting it by heating and pressurizing, and partially permeating it between the reinforced fiber materials.

In the example illustrated in FIG. 1(c), there are the reinforced fiber materials on the both faces of the thermoplastic resin material in a sheet-like shape, and a surface part of the thermoplastic resin material s partially infiltrated between the reinforced fiber materials. There is a part where the thermoplastic resin material is not infiltrated in the reinforced fiber materials. Such an unimpregnated state can be realized by abutting the reinforced fiber bundle on both faces of the thermoplastic resin sheet material, and then heating and pressurizing them.

In the specific example illustrated in FIGS. 1(a)-1(c), the semi prepreg sheet material having the preferable quality can be obtained by forming the reinforced fiber materials into a thin, wide sheet material by an opening operation for use. Further, the semi prepreg sheet material may be in any state of the three patterns illustrated as the specific examples, and also in a state where a plurality of patters of the three patters is mixed.

It is preferable that the average number of the fibers of the semi prepreg sheet material in the thickness direction be set in the range from two to ten. When the average number of the fibers in the thickness direction is set in the range from two to ten, the semi prepreg sheet material in the unimpregnated state includes several units of fibers raving no permeating thermoplastic resin material. Therefore, when the composite material molding product is obtained from the quasi-isotropic reinforced sheet material produced from the semi prepreg sheet material as the chopped semi prepreg sheet material, the quasi-isotropic reinforced sheet material is molded from the unimpregnated state to the impregnated state heating and pressurizing. The time for making the impregnated state can be decreased, and further the impregnated state includes less voids, and thus the composite material molding product having good quality can be obtained in a short time.

As described below, the average number of fibers in the thickness direction can be calculated based on the thickness in the impregnated state, a fiber volume fraction, and a diameter of a single thread of the reinforced fiber material.

As described above, since, in the semi prepreg sheet material in the unimpregnated state, the resin part exists in which the thermoplastic resin material is not infiltrated between the reinforced fiber materials, the crack in the fiber direction of the reinforced fiber is not easily generated. Since the semi prepreg sheet material in the unimpregnated state is compressed in the thickness direction to be set in the impregnated state, the semi prepreg sheet material in the unimpregnated state is thicker than that in the impregnated state. Therefore, by comparing the thickness with that in the impregnated state, it is possible to quantitatively set a level of the unimpregnated state.

Specifically, defining the thickness in the impregnated state as "$t_p$", it is preferable that the thickness "t" of the semi prepreg sheet material be set to satisfy the following expression.

$$t_p < t \leq 2 \times t_p$$

The average number of the fibers in the semi prepreg sheet material in the thickness direction is set to small numbers, as two to ten. In other words, the semi prepreg sheet material is set in the thin state. In the semi prepreg sheet material in such a state, when the thickness "t" is within the set range, even if the semi prepreg sheet material is chopped along the fiber direction of the reinforced fiber material when the chopped semi prepreg sheet material is produced, almost no fluff of the reinforced fiber material is generated on a chopped face. When the thickness "t" exceeds more than two times the thickness "$t_p$" in the impregnated state, since a small amount of the thermoplastic resin material is infiltrated between the reinforced fiber materials to increase the unimpregnated part, when the semi prepreg sheet material is chopped along the fiber direction, much fluff of the reinforced fiber material is generated on the chopped face. When much fluff is generated on an end face of the chopped semi prepreg sheet material, as described below, it is difficult to disperse the chopped semi prepreg sheet materials uniformly due to the fluff when the chopped semi prepreg sheet materials are dispersed. Therefore, the reinforced sheet material is produced in which the chopped semi prepreg sheet materials are dispersed unevenly, to cause deterioration of the dynamic property of the molding product. Moreover, when the molding is performed using the reinforced sheet material, the fluidity may be deteriorated due to an impact of the fluff of the chopped semi prepreg sheet materials.

The thickness "t" of the semi prepreg sheet material or the chopped semi prepreg sheet material (hereinafter, referred to as "target sheet material") can be obtained by actual measurement. For example, using an outside micrometer of a minimum indication amount 0.001 mm specified by JIS B 7502 (compliant with International Standard ISO 3611), it is possible to obtain the thickness "t" by calculating an average value of the thicknesses measured at a plurality of points. The thickness "$t_p$" in the impregnated state can be obtained by two methods described below.

(1) The target sheet material is heated and pressurized to produce the pre prepreg sheet, material in the impregnated state where the thermoplastic resin material is infiltrated all over the reinforced fiber materials. Similarly to the target sheet material, the thickness of the produced pre prepreg sheet material is actually measured at a plurality of points, and an average value is calculated to give the thickness "$t_p$".

(2) When specific gravity $\rho_1$ (g/cm$^3$) and basis weight $W_1$ (g/m$^2$) of the reinforced fiber materials used for the target sheet materials are defined, and also specific gravity $\rho_2$ (g/cm$^3$) and basis weight $W_2$ (g/m$^2$) of the thermoplastic resin material are defined, the thickness $t_p$ in the impregnated state can be obtained by the expression described below.

$$t_p(mm) = ((W_1/\rho_1) + (W_2/\rho_2))/1000$$

Further, it is preferable that the fiber volume fraction of the target sheet material in the impregnated state be set from 30% to 70%. When the fiber volume fraction is lower than 30%, a reinforcement effect of a long fiber is decreased. When the fiber volume fraction is over 70%, resin impregnation into the reinforced fiber bundle is difficult, and thus the voids are easily generated to deteriorate the quality.

When the thickness "$t_p$" (mm), the fiber volume fraction Vf (%), and the diameter of the single thread φ (mm) in the impregnated state are defined, the average number "n" of the fibers in the thickness direction is calculated by the expression described below.

$$n(\text{number}) = (t_p \times (Vf/100))/\varphi$$

For example, when the thickness in the impregnated state is 0.05 mm, the fiber volume fraction is 60%, and the diameter of the single thread is 7 μm, the average number (n) of the fibers in the thickness direction is calculated to be approximately 4.3 by the expression described below.

$$(0.05 \times (60/100))/0.007 = 4.29$$

Here, it is preferable that the thickness "$t_p$" when the target sheet material using the carbon fiber as the reinforced fiber material is set in the impregnated state be in a range from 20 μm to 80 μm. When the diameter of the single thread of the carbon fiber is from 5 μm to 7 μm, and the fiber volume fraction is from 30% to 70%, considering that the average number of the fibers in the thickness direction in the impregnated state is set in the range from two to ten, the thickness "$t_p$" is in the range from 20 μm to 80 μm. Therefore, the thickness "t" in the unimpregnated state is set to be 20 μm < t ≤ 160 μm.

When the thickness "tp" of the chopped semi prepreg sheet material after the resin is impregnated is thin to be from 20 μm to 80 μm, the gap of parts where the chopped semi prepreg sheet materials are overlapped with each other can be narrowed, when the composite material molding product is produced. With this arrangement, meandering of the fibers can be reduced to sufficiently make the most of original properties of the fibers and, further, the void that can be easily generated in a space in the gap can be prevented.

The chopped semi prepreg sheet material can be obtained by chopping the semi prepreg sheet material in a desired width and length. Specifically, it is preferable that a width be set in a range from 1 mm to 30 mm and a length be set in a range from 5 mm to 100 mm. When the width is smaller than 1 mm, an amount of the fluff is increased when the semi prepreg sheet material is chopped. Therefore, the fluidity of the quasi-isotropic reinforced sheet material is deteriorated to lower the dynamic property of the obtained composite material molding product. When the width is larger than 30 mm, the quasi-isotropic property, which is the dynamic property of the quasi-isotropic reinforced sheet material, is lowered. When the length is smaller than 5 mm, a tension property of the reinforced fiber material cannot be sufficiently obtained and, thus, the dynamic property of the obtained composite material molding product is lowered. When the length is longer than 100 mm, overlapping between the chopped semi prepreg sheet materials is increased to increase an impact level when they flow and, thus, the fluidity of the quasi-isotropic reinforced sheet material is deteriorated.

Figure 2:
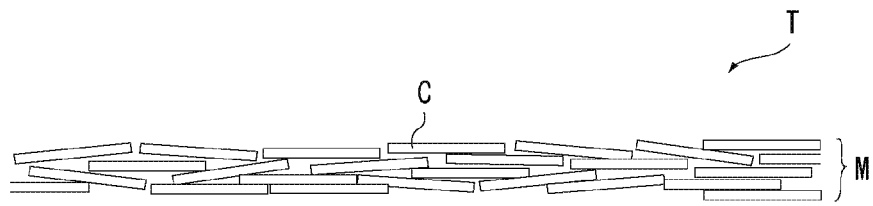
FIG. 2 is a schematic cross-sectional view illustrating a quasi-isotropic reinforced sheet material produced using a chopped semi prepreg sheet material.

FIG. 2 is a schematic cross-sectional view illustrating the quasi-isotropic reinforced sheet material produced using the chopped semi prepreg sheet material described above. In the example, a plurality of chopped semi prepreg sheet materials C is dispersed by natural drop or the like and thus randomly overlapped with each other. Thus, a quasi-isotropic reinforced sheet materials T is in a state where the chopped semi prepreg sheet materials C are overlapped with each other such that the fiber direction s of the reinforced fiber materials are randomly oriented in the two-dimensional direction. Further, by heating and pressurizing the chopped semi prepreg sheet materials C in the overlapped state, they are bonded with each other to be integrated as a layered body M as a whole.

Note that the layered body M is integrated to substantially maintain its form in a sheet-like shape with the chopped semi prepreg sheet materials C. If the sheet-like form is substantially maintained with the chopped semi prepreg sheet materials C, materials other than the above described chopped semi prepreg sheet materials can be also mixed.

It is preferable for the quasi-isotropic reinforced sheet materials T that the average number of the chopped semi prepreg sheet materials C in the thickness direction be set in the range from two to ten and, further preferable in a range from three to seven. Setting the range of the number as described above makes it possible to securely bond and integrate the chopped semi prepreg sheet materials C with each other, even if pressure when heating and pressurizing is small. Thus, damage on the reinforced fiber materials can be minimized as much as possible. Further, it is preferable that the thickness of the chopped semi prepreg sheet material C be set to be thinner than 0.1 mm. Such thin chopped semi prepreg sheet materials C are overlapped with each other to decrease the thickness of an entire quasi-isotropic reinforced sheet material T and to decrease a size of the gap inside. Thus, the flexibility and the drape property can be provided. Therefore, the quasi-isotropic reinforced sheet material T can be wound in a rolled shape to greatly improve its handling.

Further, when the quasi-isotropic reinforced sheet material T is molded by laminating, since the quasi-isotropic reinforced sheet material T is formed in a thin-plate-like shape, the molding in a curved shape can be efficiently handled even in a laminated state. In the laminated state where the thin chopped semi prepreg sheet materials C are overlapped with each other in the range of the average number of two to ten, a surface of the quasi-isotropic reinforced sheet material T is formed in an almost plain shape. Furthermore, when the quasi-isotropic reinforced sheet material T is molded by heating and pressurizing after the laminating is performed, since an end edge of the chopped semi prepreg sheet material C is not protruded not to disturb the flow on a contact surface of the quasi-isotropic reinforced sheet material T, the quasi-isotropic reinforced sheet material T smoothly flows to realize a preferable fluidity.

Moreover, as illustrated in FIGS. 1(b) and 1(c), the chopped semi prepreg sheet material obtained using the semi prepreg sheet material exposes its fiber parts, on both surfaces in which the thermoplastic resin material is not infiltrated. If the chopped semi prepreg sheet materials come into contact with each other and the exposed fiber parts are rubbed therewith, contact resistance caused by the rub of the fiber parts is generated so that the overlapped chopped semi prepreg sheet materials can hardly spread away in random directions if the overlapping is continued. Therefore, the average number of the chopped semi prepreg sheet materials to be overlapped in the thickness direction is set in the range from two to ten, so as to decrease the contact resistance caused by the rub of the fiber parts. Thus, the chopped semi prepreg sheet materials can easily spread away in the random directions.

Figure 3:
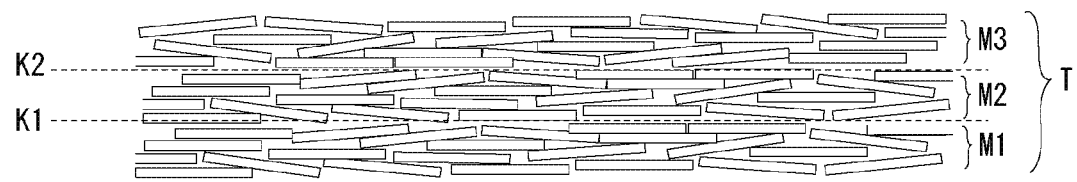
FIG. 3 is a schematic cross-sectional view illustrating another quasi-isotropic reinforced sheet material produced using the chopped semi prepreg sheet material.

FIG. 3 is a schematic cross-sectional view illustrating another quasi-isotropic reinforced sheet material produced using the above described chopped semi prepreg sheet material. In the example, the plurality of chopped semi prepreg sheet materials C is dispersed due to the natural drop or the like and randomly overlapped with each other so as to form a state where they are overlapped with each other such that the fiber directions of the reinforced fiber materials are oriented randomly in the two-dimensional direction. The quasi-isotropic reinforced sheet material T' is formed by laminating and integrating a plurality of layered bodies M1 to M3 each obtained by bonding and integrating the chopped semi prepreg sheet materials C with each other by performing heating and pressurizing in the overlapped state.

The quasi-isotropic reinforced sheet material T' is formed in a three-layer structure with a boundary face K1 that is an upper face of the layered body M1 and a boundary face K2 that is an upper face of the layered body M2. Each of the layered bodies M1 to M3 sectioned by the boundary faces K1 and K2 is configured by bonding and integrating the chopped semi prepreg sheet materials C in the overlapped state. Further, the chopped semi prepreg sheet material C is bonded to the adjacent chopped semi prepreg sheet material C with the form before bonding maintained as it is, and a gap is formed between the chopped semi prepreg sheet materials C.

Further, a bonding state (bonding position, bonding force, and the like) in the layered body is different from that of the adjacent layered body on the boundary face K1 or K2. Since the chopped semi prepreg sheet material C is overlapped on the upper face of the layered body formed on a surface having less unevenness by heating and pressurizing, they move over more easily between the layered bodes than in the layered body. Therefore, a freedom level is larger between the layered bodies than in the layered body, and thus, the flexibility and the drape property of the quasi-isotropic reinforced sheet material T' can be increased. Accordingly, the quasi-isotropic reinforced sheet material T' can be wound in a rolled shape to greatly improve the handling. Further, when the quasi-isotropic reinforced sheet material T' is laminated and, then, heated and pressurized to be molded, on the boundary faces in the quasi-isotropic reinforced sheet material T' and the contact faces between the sheet materials, the chopped semi prepreg sheet materials C are scarcely engaged with each other to bother smooth flow.

Accordingly, chopped semi prepreg sheet materials C smoothly flow to realize the preferable fluidity.

Similar to the conventional technique, when the same amount as the above-described three layers of the chopped semi prepreg sheet materials C are overlapped with each other and they are bonded and integrated at a time by heating and pressurizing, the entire part of the chopped semi prepreg sheet materials C is set in the same bonding state. Therefore, the chopped semi prepreg sheet materials C are formed in a plate-like shape to deteriorate the flexibility and the drape property. However, if the chopped semi prepreg sheet materials C are sequentially bonded and integrated in the overlapped state in the range of the average number of the chopped semi prepreg sheet materials C from two to ten in the thickness direction, and a plurality of layered bodies is laminated, the quasi-isotropic reinforced sheet material maintaining the flexibility and the drape property can be obtained.

Further, when the plurality of layered bodies is laminated and integrated in the overlapped state, the resin layer part can be arranged at least partially between the adjacent layered bodies. For example, the resin layer part may be arranged all over between the layered bodies including two layers or more. Further, the resin layer part may be partially arranged between the adjacent layered bodies. The resin layer part includes a part where only resin is formed in the layered state, or a part including much resin in the layered state where the fiber volume fraction is lower than in a surrounding part.

Since such a resin layer part exists between the layered bodies, the fiber volume fraction of the composite material molding product using the quasi-isotropic reinforced sheet material can be lowered, and the dynamic property can be changed. For example, when a curving deformation is applied on the molding product, the resin layer part is sheared and deformed and thereby likely to be curved and deformed. When the resin layer part is formed, the resin material in a film-like shape, a sheet-like shape, a grain-like shape, or a short-fiber-like shape is arranged between the layered bodies and heated and pressurized together with the layered bodies, so that the resin material can be fusion-bonded to make the resin layer part. For the resin layer part, the material same as the thermoplastic resin material used for the chopped semi prepreg sheet material can be used, but different thermoplastic resin material can be also used.

Figure 4:
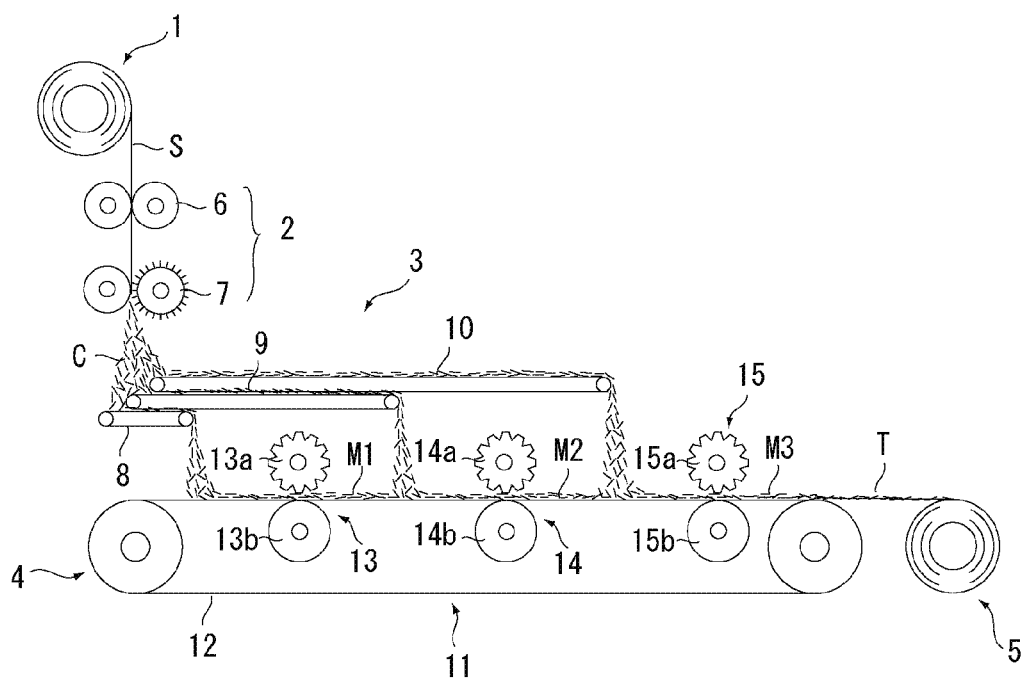
FIG. 4 is a schematic configuration view illustrating a production apparatus of the quasi-isotropic reinforced sheet material.

FIG. 4 is a schematic configuration view illustrating a production apparatus or the quasi-isotropic reinforced sheet material. The production apparatus includes a sheet material supply mechanism 1, a sheet material chopping mechanism 2, a chopped member conveying mechanism 3, a sheet integration mechanism 4, and a sheet winding mechanism 5. The sheet material supply mechanism 1 unwinds and supplies the semi prepreg sheet material S wound on a paper tube of three inches, or the like. The sheet material supply mechanism 1 supplies the semi prepreg sheet material S while applying a desired tension force thereto so that a chopping action in the sheet material chopping mechanism 2 can be smoothly performed. For example, the semi prepreg sheet material S may be unwound at a predetermined supply speed by driving means such as a motor. Further, a brake mechanism can be included so that the semi prepreg sheet material S is unwound by the sheet material chopping mechanism 2 at the predetermined supply speed.

The sheet material chopping mechanism 2 includes a longitudinal chopping part 6 and a lateral chopping part 7. The longitudinal chopping part 6 chops the semi prepreg sheet material S by a predetermined width in a band-like shape along a supply direction. The longitudinal chopping part 6 can use known sheet chopping means such as a gang-cutting method, a shah-cutting method, and a score-cutting method. The gang-cut method makes the upper blade and the lower blade, which are rotation round blades, lap with each other, and performs chopping with a shearing force while the semi prepreg sheet material S is held with a small clearance provided between the upper blade and the lower blade. In the shah-cut method, the upper blade of the rotation round blade including a chopping edge of a sharp angle having a relief angle is set such that its leading edge is pressed against a side face of the lower blade (rotation round blade), and the semi prepreg sheet material S runs on the set part to be chopped. The mechanism described above is similar to that for performing the chopping with a pair of scissors, which can perform the chopping without escape of the sheet material. In the score-cut method, the semi prepreg sheet material S runs in contact with the lower blade roll formed with high hardness by heat treatment or the like. The semi prepreg sheet material S is chopped while the upper blade roll of the rotation round blade is pressed against a part of the semi prepreg sheet materials S in contact with the lower blade roll. When the semi prepreg sheet material S is supplied in a state where it is wound on the paper tube or the like and in a form of being cut previously in the same width as that of the chopped semi prepreg sheet material C, the longitudinal chopping part 6 does not need to be used.

The lateral chopping part 7 chops the semi prepreg sheet material S, which is chopped in a predetermined width in the supply direction, in a direction orthogonal to the supply direction to produce the chopped semi prepreg sheet material C having a predetermined length. The lateral chopping part 7 includes, for example, a chopping apparatus in which a cut roll is arranged facing a rotation roll having high hardness. Around the cut roll, a plurality of chopping blades is aligned along an axis direction at a predetermined interval. While the semi prepreg sheet material S runs in contact with the rotation roll, the chopping blade of the cut roll is sequentially pressed against the semi prepreg sheet material S to chop it, and thereby, the chopped semi prepreg sheet material C having a predetermined length can be produced. Further, by using the cut roll having a different mounting space of the chopping blade, the chopped send prepreg sheet material C having a different length can be also produced. For example, if the mounting space of the chopping blade is set to 10 mm, 50 mm, 100 mm, the chopped semi prepreg sheet materials C having the same length as the space can be produced at the same ratio. Further, if the mounting space of the chopping blade is set to 10 mm, 50 mm, 100 mm, 100 mm, a ratio for producing the chopped semi prepreg sheet material C having the length 100 mm can be increased. By using the chopped semi prepreg sheet material C having a different length, the dynamic property and the fluidity of the obtained quasi-isotropic reinforced sheet material T can be controlled. For example, when the chopped semi prepreg sheet material C is long, the dynamic property of the layer molding product using the quasi-isotropic reinforced sheet material T is improved, but the fluidity when the molding is performed is lowered. On the other hand, when the chopped semi prepreg sheet material C is short, the dynamic property of the laminated molding product using the quasi-isotropic reinforced sheet material T is lowered, but the fluidity is improved. By including the chopped semi prepreg sheet materials C having the different lengths together, the quasi-isotropic reinforced sheet material can be obtained in which balance between the dynamic property and the fluidity is optimized.

The chopped member conveying mechanism 3 includes three distribution conveyors 8 to 10, and the chopped semi prepreg sheet materials C that are chopped are divided into three and conveyed. It is preferable that an amount to be distributed to each distribution conveyor be set to be equal. A carry-out position of each distribution conveyor is set, at a predetermined interval shifted in a conveying direction. The chopped semi prepreg sheet material C is continuously conveyed by each distribution conveyor, and continuously drops at the carry-out position. The carry-out amount per unit time of the chopped semi prepreg sheet materials C that drop is set based on an amount of supply per unit time of the chopped semi prepreg sheet materials C and a conveying speed of the distribution conveyor.

The sheet integration mechanism 4 includes a conveying conveyor 11 that receives and conveys the dropped chopped semi prepreg sheet materials C by a conveying belt 12, and three bonding rolls 13 to 15 that integrate the chopped semi prepreg sheet materials C to be conveyed. The plurality of chopped semi prepreg sheet materials is integrated with each other by each bonding roll in a state where the fiber directions of the reinforced fiber materials are oriented randomly in the two-dimensional direction so as to form the layered body, and the three formed layered bodies are laminated and integrated.

The conveying conveyor 11 is arranged below the three carry-out positions of the chopped semi prepreg sheet materials C, and an endless conveying belt 12 is held over a pair of conveying rollers. The conveying direction of the conveying belt 12 is set along the three carry-out positions. The conveying belt 12 includes materials having a heat-resistance property such as heat-resistant rubber material and metal material, and is set to receive the chopped semi prepreg sheet materials C dropping from the three carry-out positions at the three laminating positions, respectively. The three laminating positions are arranged at a predetermined interval, and the bonding rolls 13 to 15 are arranged at downstream sides of the laminating positions, respectively. Each bonding roll includes a heating roller arranged at a conveyance face side of the conveying belt 12, and a pressing roller arranged at an opposite side of the conveyance face. Further, the chopped semi prepreg sheet materials C conveyed by the conveying belt 12 in an overlapped state are held between the heating roller and the pressing roller to be heated and pressurized, and thereby they are bonded and integrated in the layered state.

The chopped semi prepreg sheet materials C dropping from each carry-out position to each laminating position drop in a scattered manner with the fiber directions facing random directions. On the conveying belt 12, the fiber direction is oriented randomly in the two-directional direction so that the chopped semi prepreg sheet materials C are overlapped with each other. It is preferable that the chopped semi prepreg sheet materials C be uniformly dispersed to be overlapped with each other, and also it is preferable that the average number of the overlapping chopped semi prepreg sheet materials C in the thickness direction be set in the range from two to ten. It is further preferable that the average number be set in the range from three to seven.

If the average number of the chopped semi prepreg sheet materials C in the thickness direction is set in the range from two to ten, when bonding and integration are performed with the bonding roll, disturbance of orientation in the directions of the fibers included in the chopped semi prepreg sheet material C can be minimized as much as possible. Further, the number of the chopped semi prepreg sheet materials C in the thickness direction at one laminating position is decreased and the chopped semi prepreg sheet materials C are arranged in parallel to each other at a plurality of laminating positions, so that production speed of the quasi-isotropic reinforced sheet material can be increased. Therefore, the chopped semi prepreg sheet materials C are uniformly dispersed, and a uniform bonding state can be realized when bonding by heating and pressurizing is performed.

If the average number of the chopped semi prepreg sheet materials C overlapping each other in the thickness direction is more than ten, in order to bond all the chopped semi prepreg sheet materials C that are overlapped with each other via the thermal fusion bonding or the like, the pressure needs to be increased. However, if the pressure becomes higher, the reinforced fiber in the chopped semi prepreg sheet material C may meander, or may be chopped. Further, if the number of the chopped semi prepreg sheet materials C in the thickness direction exceeds ten, it takes time for all the chopped semi prepreg sheet materials C, which are overlapped with each other, to reach a predetermined heating temperature. Therefore, the conveying speed cannot be increased for secure bonding and integration.

Further, if the average number of the chopped semi prepreg sheet materials C in the thickness direction is set to three or more, they can be overlapped with each other at the laminating position without gaps. If the average number of the chopped semi prepreg sheet materials C in the thickness direction is set within seven, even when the overlapped chopped semi prepreg sheet materials C are partially bonded with each other via the thermal fusion bonding or the like, bonding and integration can be securely performed in a short time.

The average number of the chopped semi prepreg sheet materials C in the thickness direction can be adjusted by controlling the conveying speed of the conveying conveyor 11 relative to the carry-out amount per unit time of the dropping chopped semi prepreg sheet materials C. To make the fiber direction into a random direction when the chopped semi prepreg sheet materials C drop, they may be scattered by a rotating fin, or the air may be blown out to scatter them.

The chopped semi prepreg sheet materials C, which drop from the carry-out position of the distribution conveyor 8 and are overlapped with each other at the laminating position at the most upper-stream side, are heated and pressurized by a heating roller 13a and a pressing roller 13b of the bonding roll 13 while being conveyed by the conveying belt 12. The thermoplastic resin materials included in the chopped semi prepreg sheet materials C are partially melted by being heated to bond with each other and, thus, integrated into a layered state to form the layered body M1. A heating temperature of the heating roller 13a is set to a temperature, at which the chopped semi prepreg sheet materials C being conveyed in the overlapped state are securely bonded and integrated with each other. Further, a pressure by the pressing roller 13b is set to a level, at which the chopped semi prepreg sheet materials C in the overlapped state are made to come into close contact with each other to be pressed against the heating roller 13a and, still, no impact is applied to the reinforced fiber materials in the chopped semi prepreg sheet materials C.

A peripheral face of the heating roller 13a illustrated in FIG. 4 is formed in an uneven shape. Protruding portions of the heating roller 13a come into contact with the chopped semi prepreg sheet materials C to partially heat them, and bond them with each other via the thermal fusion bonding, so as to integrate the chopped semi prepreg sheet materials C. When the chopped semi prepreg sheet materials C are partially bonded with each other, partial bonding positions and the number of the positions may be set to prevent the chopped semi prepreg sheet materials C from dropping off. Specifically, partial bonding may be performed on one chopped semi prepreg sheet material C at approximately one to five places. Further, it is also possible to entirely heat the peripheral face as a cylindrical face to entirely bond the chopped semi prepreg sheet materials C with each other. Furthermore, by controlling the heating temperature and the pressure, the chopped semi prepreg sheet materials C can be partially bonded with each other, and the partial range can be also controlled.

The layered body M1 obtained by integrating the chopped semi prepreg sheet materials C, which are overlapped with each other by the bonding roll 13, in a layered state is conveyed by the conveying belt 12. At a subsequent laminating position, the chopped semi prepreg sheet materials C drop from the distribution conveyor 9 and are placed on the upper face so as to overlap with each other. While the chopped semi prepreg sheet materials C are conveyed by the conveying belt 12 in a state where they are overlapped with each other on the upper face of the layered body M1, the chopped semi prepreg sheet materials C are heated and pressurized by a heating roller 14a and a pressing roller 14b of a bonding roll 14. The chopped semi prepreg sheet materials C, which are heated by the heating roller 14a to be in the overlapped state, are bonded with each other with the thermoplastic resin material that are heated and partially melted. Thereby, the chopped semi prepreg sheet materials C are integrated in the layered state to form the layered body M2. The heating temperature of the heating roller 14a is set such that the chopped semi prepreg sheet materials C in the overlapped state are securely bonded and integrated and, further, they become in the bonding state also on the boundary face between the layered body M1 and the chopped semi prepreg sheet materials C in the state of overlapping with the layered body M1, so as to integrate the layered bodies M1 and M2.

The layered bodies M1 and M2 integrated in the layered state by the bonding roll 14 are conveyed by the conveying belt 12, and at the subsequent laminating position, are placed such that the chopped semi prepreg sheet materials C dropping from the distribution conveyor 10 onto the upper face so as to overlap with each other. Further, while the chopped semi prepreg sheet materials C are conveyed by the conveying belt 12 in a state where they are overlapped with each other on the upper face of the layered body M2, the chopped semi prepreg sheet materials C are heated and pressurized by a heating roller 15a and a pressing roller 15b of a bonding roll 15. The chopped semi prepreg sheet materials C, which are heated by the heating roller 15a to be in the overlapped state, because the thermoplastic resin materials are partially melted by heating and bonded with each other, are integrated in the layered state to form the layered body M3. The heating temperature of the heating roller 15a is set such that the chopped semi prepreg sheet materials C in the overlapped state are securely bonded and integrated and, they become in the bonding state also on the boundary face between the layered body M2 and the chopped semi prepreg sheet materials C in the state of overlapping with the layered body M2, so as to integrate the layered bodies M1 to M3.

Thus, the quasi-isotropic reinforced sheet material T obtained by integrating the layered bodies M1 to M3 is formed by the bonding roll 15. As described above, since the chopped semi prepreg sheet materials C are sequentially overlapped to be bonded and integrated through the three divided steps, the quasi-isotropic reinforced sheet material T is integrated by laminating three layered bodies obtained by bonding and integrating the chopped semi prepreg sheet materials C in the overlapped state.

The sheet winding mechanism 5 winds the quasi-isotropic reinforced sheet material T, which is integrated and formed by the bonding roll 15, into a rolled shape on the paper tube or the like. As described above, since the quasi-isotropic reinforced sheet material T has the flexibility and the drape property, similarly to the conventional thermal-setting resin prepreg sheet material or the thermoplastic resin prepreg sheet material, it can be wound on the paper tube or the like having a diameter of 3 inches (approximately 76 mm) to 12 inches (approximately 305 mm), and thus, similarly to the conventional prepreg sheet material, it can be easily handled.

FIG. 5 is a schematic configuration view illustrating the modification of the production apparatus illustrated in FIG. 4. In the example, three sheet material supply mechanisms 1A to 1C and three sheet material chopping mechanisms 2A to 2C are arranged. In each mechanism, the chopped semi prepreg sheet materials C are produced to be supplied to a laminated position of the sheet integration mechanism 4. Since the production speed of the chopped semi prepreg sheet materials C becomes three times higher, the production speed of the quasi-isotropic reinforced sheet materials can be increased.

In the example described above, the quasi-isotropic reinforced sheet material obtained by laminating the three layered bodies is produced. However, the number of the mounted heating rolls in the sheet integration mechanism is appropriately set and the chopped semi prepreg sheet materials are supplied to each heating roll, so that the quasi-isotropic reinforced sheet materials obtained by laminating two or more layered bodies can be produced. Further, the chopped semi prepreg sheet materials C for only one layer are supplied to the sheet integration mechanism, so that the quasi-isotropic reinforced sheet material formed with one layered body illustrated in FIG. 2 can be also produced.

In the sheet integration mechanism, the resin material may be arranged in the layered state at least partially between the adjacent layered bodies, to form the resin layer part. For example, after the layered body is formed with the chopped semi prepreg sheet materials, the resin material in the film-like shape, a sheet-like shape, a grain-like shape, or a short fiber-like shape is supplied on the face of the layered body and arranged in the layered state to produce and laminate the subsequent layered body, so that the quasi-isotropic reinforced sheet material including the resin layer part can be produced.

When the composite material molding product is molded using the produced quasi-isotropic reinforced sheet materials, one or more quasi-isotropic reinforced sheet materials are laminated in the thickness direction, and heated and pressurized to be molded, thus giving the composite material molding product. Since the quasi-isotropic reinforced sheet material has the flexibility and the drape property as described above, it can be molded along a shape of a molding shape such as a curved shape or an uneven shape, other than a flat-plate-like shape.

Note that, when the quasi-isotropic reinforced sheet materials are laminated in a plurality of layers, if the resin materials are arranged between the layers to be molded into the composite material molding product, the resin layer part can be formed at least partially in the composite material molding product. The resin layer part may be formed in the layered state all over or on a part between the quasi-isotropic reinforced sheet materials. When the resin materials are arranged between the quasi-isotropic reinforced sheet materials, the resin materials in the film-like shape, a sheet-like shape, grain-like shape, or a short fiber-like shape may be supplied and arranged in the layered state. As the resin material, the resin different from that included in the quasi-isotropic reinforced sheet material may be used.

In the composite material molding product obtained by laminating the necessary number of layers of quasi-isotropic reinforced sheet materials and resin sheet materials at necessary points and heating and pressurizing them, the resin layer part in the layered state can be formed by adjusting the heating temperature and the pressure. The resin layer part is formed at a part where only resin is formed in the layered state or at a part including much resin in the layered state where the fiber volume fraction is lower than that in a surrounding part. Since parts including much resin exist, the fluidity is improved to improve forming property at the time of molding.

Further, since the thickness of the chopped semi prepreg sheet material is set in the range from two times to ten times larger than the diameter of the single thread of the reinforced fiber material, the thermoplastic resin material can be easily impregnated among the reinforced fiber materials when the molding is performed by heating and pressurizing. Therefore, the voids can be prevented from being generated. Furthermore, the quasi-isotropic reinforced sheet material includes the layered bodies, which are obtained by overlapping the thin chopped semi prepreg sheet materials in the thickness direction in the range from two to ten sheet materials in the average number. Thus, the fluidity when the molding is performed can be improved. For example, when the quasi-isotropic reinforced sheet material having the three-layer structure, illustrated in FIG. 3 is heated and pressurized to be molded, the quasi-isotropic reinforced sheet materials are pressurized and heated into the impregnated state, and then, the thermoplastic resin material in the chopped semi prepreg sheet material is melted so that the reinforced fiber materials flow. Since the chopped semi prepreg sheet materials move over more easily between the layered bodies in the quasi-isotropic reinforced sheet material, the fluidity of the reinforced fiber materials along the boundary face of the layered bodies is improved and also uniformed. Therefore, even when the quasi-isotropic reinforced sheet materials are laminated in the plurality of layers, the fluidity of the entire aminated bodies is improved and the unevenness is decreased, so that the molding product having the preferable quality can be obtained.

As the conventional technique, when the chopped semi prepreg sheet materials are molded by heating and pressurizing in a state where several dozens of chopped semi prepreg sheet materials are overlapped with each other in the thickness direction, the reinforced fiber materials oriented randomly in the two-dimensional direction are impacted by each other. Accordingly, the unevenness of the fluidity of the melted thermoplastic resin material is generated to lower the fluidity of the reinforced fiber materials. On the other hand, as described above, the chopped semi prepreg sheet materials are bonded and integrated to make a structure including the plurality of layered bodies in the state where they are overlapped with each other in the range from two to ten sheet materials in the average number in the thickness direction. Therefore, even when several dozens of chopped semi prepreg sheet materials are overlapped, the fluidity and the uniformity can be improved.

Further, in the chopped semi prepreg sheet material in which the resin impregnates the reinforced fiber bundle, when the chopped semi prepreg sheet materials having the thickness of 0.1 mm or more are overlapped with each other, the gap between the chopped semi prepreg sheet materials is large. When the chopped semi prepreg sheet materials are heated and pressurized to be molded, the chopped semi prepreg sheet materials are pressed into the gap to cause the meandering of the reinforced fiber materials. The shape inside the layered body and that of the boundary face between the layered bodies may be changed due to deformation of the chopped semi prepreg sheet material and, thus, the improvement and uniformity of the above described fluidity may not be obtained. Therefore, it is preferable that the thickness of the chopped semi prepreg sheet material be set to be thinner than 0.1 mm. More specifically, it s preferable that the thickness be from 20 µm to 80 µm.

As described above, the quasi-isotropic reinforced sheet material according to the present invention uses the chopped semi prepreg sheet material in the unimpregnated state. Since the chopped semi prepreg sheet material partially includes a converged portion of the reinforced fiber materials and a resin part of the thermoplastic resin material inside, it has the flexibility and the drape property. The chopped semi prepreg sheet materials having the property described above are bonded and integrated in the state where they are overlapped with each other in the range from two to ten sheet materials in the average number in the thickness direction, to form the layered body. Therefore, the layered body itself has the flexibility and the drape property and, further, even when the plurality of layered bodies is laminated, the layered bodies can easily move off to have more freedom level. Thus, the quasi-isotropic reinforced sheet material can have the flexibility and the drape property. Furthermore, as an effect of moving off the bonding part between the layered bodes, the easy moving off between the layered bodies can be improved.

Further, when the quasi-isotropic reinforced sheet material according to the present invention is produced, by using the semi prepreg sheet material in the unimpregnated state, the chopped semi prepreg sheet material having the preferable quality can be obtained without generating the crack caused by a shock, or the like, when the chopping is performed.

Further, when the semi prepreg sheet material is chopped, since the semi prepreg sheet material is in the unimpregnated state, the converged part of the reinforced fiber materials easily generate the fluff due to the chopping. Therefore, the average number of fibers of the semi prepreg sheet material in the thickness direction is set in the range from two to ten and, also, the thickness "t" relative to the thickness "$t_p$" in the impregnated state is set in the range of $t_p < t \leq 2 \times t_p$. With this arrangement, the number of fibers of the converged part in which the thermoplastic resin material is not infiltrated is decreased, and a length of the part in which the resin is not impregnated in the fiber direction is shortened. At the converged part in such a state, the fluff caused by the chopping is not easily generated and, also, a length of the fiber flying out as the fluff is shortened to decrease the impact when the producing is performed.

Furthermore, the quasi-isotropic reinforced sheet material according to the present invention includes the layered bodies obtained by bonding and integrating the chopped semi prepreg sheet materials in the state where they are overlapped with each other in the range from two to ten sheet materials in the average number in the thickness direction. Therefore, when the quasi-isotropic reinforced sheet material is heated and pressurized to be molded, the uniform fluidity can be obtained in the layered body. Further, when the plurality of layered bodies is laminated and integrated, the fluidity in a direction along the boundary face between the layered bodies can be uniformed. Therefore, the chopped semi prepreg sheet material smoothly flows along the boundary face to decrease disturbance of the orientation of the reinforced fiber materials so as to maintain straightness. Therefore, the molding can be performed with the quasi-isotropic property maintained.

Moreover, the quasi-isotropic reinforced sheet material according to the present invention uses the chopped semi prepreg sheet materials having the average number of the fibers in the thickness direction set in the range from two to ten. The chopped semi prepreg sheet materials are integrated by being overlapped with each other to have the average number of the fibers in the thickness direction in the range from two to ten. By using the thin chopped semi prepreg sheet materials, the meandering of the fibers due to the overlapping of the chopped semi prepreg sheet materials with each other can be minimized as much as possible. Therefore, the chopped semi prepreg sheet materials can be bonded and integrated while existing in a plain state. Thus, when the quasi-isotropic reinforced sheet material is heated and pressurized to be molded, the chopped semi prepreg sheet materials smoothly flow along a face direction to improve the fluidity of the quasi-isotropic reinforced sheet material.

The quasi-isotropic reinforced sheet material according to the present invention includes the layered bodies obtained by using the thin chopped semi prepreg sheet materials having the average number of fibers in the thickness direction set in the range from two to ten, and bonding and integrating them in the state where they are overlapped with each other to have the average number of fibers in the thickness direction in the range from two to ten. The quasi-isotropic reinforced sheet material can be formed by laminating and integrating the plurality of such layer bodies. In the composite material molding product obtained with the quasi-isotropic reinforced sheet material, the thin chopped semi prepreg sheet materials are laminated randomly in the two-dimensional direction, and dispersed uniformly also in the thickness direction. Therefore, a value of the dynamic property of the composite material molding product is increased and the variation can be decreased.

Embodiment

Embodiment 1

Using the material described below, the quasi-isotropic reinforced sheet material was produced.
<Used Material>
Reinforced fiber material, bundle of carbon fibers (produced by Mitsubishi Rayon Co. Ltd.; TR50S-15K-JJ, 15,000 fibers per bundle, diameter of single thread 7 μm) thermoplastic resin material PA6 resin film (produced by Mitsubishi Resin Co. Ltd.; Diamiron thickness 20 μm)
<Production Method of Semi Prepreg Sheet Material>
Using the known opening method of a fiber bundle (e.g., refer to Japanese Patent Laid-Open No. 2010-270420), for example, two sheets of opening carbon fiber sheets having a width 192 mm were produced. The opening carbon fiber sheets were obtained by opening each of four carbon fiber bundles by a width 48 mm, and they were aligned in a sheet-like shape in a width direction. Then, two opening carbon fiber sheets were attached to each other and, at the same time, PA6 resin film having a width 200 mm was inserted between the two opening carbon fiber sheets. The two opening carbon fiber sheets were made to continuously run between the heating and pressing rolls with the heating temperature set to 280 degrees, so as to make a structure in which the carbon fiber layers exist on both faces of the resin layer as illustrated in FIG. 1(c). Both edges are continuously cut to produce the semi prepreg sheet material having the width 180 mm.

The obtained semi prepreg sheet material has a fiber weight approximately 43 $g/m^2$ and a resin weight approximately 23 $g/m^2$. Further, the thickness of the semi prepreg sheet material in the impregnated state is approximately 0.044 mm by calculation, and the fiber volume fraction is approximately 55%. Here, the average number of fibers of the semi prepreg sheet material in the thickness direction in the impregnated state is approximately 3.5 by calculation. The thickness of the obtained semi prepreg sheet material was measured at ten points using an outside micrometer (produced by Mitsutoyo Co., Ltd.) having a minimum indication scale of 0.001 mm, and an average value of a measurement result was approximately 0.073 mm. The above described average value was within two times more than the thickness of 0.044 mm in the impregnated state. Here, the minimum value of the measurement values at ten points was 0.060 mm, and the maximum value was 0.081 mm.
<Production Method of Quasi-Isotropic Reinforced Sheet Material>

Using a sheet material supply mechanism and a sheet material chopping mechanism of the production apparatus illustrated in FIG. 5, the layered body of the quasi-isotropic reinforced sheet material was produced. The obtained semi prepreg sheet material having the width 180 mm was chopped by the width 25 mm along the fiber direction and the length 30 mm along the direction orthogonal to the fiber direction to produce the chopped semi prepreg sheet material. The supply speed of the semi prepreg sheet material was set to approximately 34 m/min, and the remaining semi prepreg sheet material having the width 5 mm after chopping was performed was separately wound as an ear part.

Subsequently, the obtained chopped semi prepreg sheet materials having the width 25 mm and the length 30 mm were made to naturally drop on the conveying belt made of steel net and dispersed. The conveying belt ran at a conveying speed 3 m/min, and the chopped semi prepreg sheet materials were dispersed in a range of the width 400 mm. The chopped semi prepreg sheet material was produced from the semi prepreg sheet material having the width 175 mm at a processing speed 34 m/min to produce the quasi-isotropic reinforced sheet material having the width 400 mm at a processing speed 3 m/min. The average number of the chopped semi prepreg sheet materials in the thickness direction, which were overlapped with each other on the conveying belt, was approximately five.

Subsequently, as a bonding roll, the heating roller with plenty of square protruding parts having 5 mm square formed on the surface was set to the heating temperature of 280 degrees, and the chopped semi prepreg sheet materials in the overlapped state were partially bonded and integrated to form the quasi-isotropic reinforced sheet material. The weight of the obtained quasi-isotropic reinforced sheet material was approximately 330 $g/m^2$.
<Property of Quasi-Isotropic Reinforced Sheet Material>

The obtained quasi-isotropic reinforced sheet material was produced as the layered body, in which the chopped semi prepreg sheet materials with the average number in the thickness direction of approximately five were laminated. The chopped semi prepreg sheet materials having the width 25 mm and the length 30 mm were oriented randomly is the two-dimensional direction with the shape before bonding maintained as it was. No chopped semi prepreg sheet material drops off, and the quasi-isotropic reinforced sheet material was wound on the paper tube of 3 inches with the tension force applied. Here, when they were unwound from a state being wound on the paper tube of 3 inches, there were no troubles such as coming off of the chopped semi prepreg sheet material.

Embodiment 2

The quasi-isotropic reinforced sheet material was produced using materials described below.
<Used Materials>
The same materials as those in Embodiment 1 were used.
<Production Method of Semi Prepreg Sheet Material>
Produced in a similar manner to Embodiment 1.
<Production Method of Quasi-Isotropic Reinforced Sheet Material>
The quasi-isotropic reinforced sheet material was produced by the production apparatus illustrated in FIG. 4. The semi prepreg sheet material having the width 180 mm was chopped by the width 5 mm along the fiber direction, and chopped by the length 30 mm along the direction orthogonal to the fiber direction to produce the chopped prepreg sheet material. The supply speed of the semi prepreg sheet material was set to approximately 70 m/min.

Subsequently, the obtained chopped semi prepreg sheet materials having the width 5 mm and the length 30 mm were divided into three, made to naturally drop at three laminated positions on the conveying belt made of the metal net, and were dispersed. The conveying belt ran at a conveying speed 3 m/min, and the chopped semi prepreg sheet materials were dispersed in a range of the width 400 mm at each laminated position. The chopped semi prepreg sheet material was produced from the semi prepreg sheet material having the width 180 mm at a processing speed of 70 m/min and divided into three to produce the quasi-isotropic reinforced sheet material having the width 400 mm at a processing speed 2 m/min. The chopped semi prepreg sheet materials were overlapped with each other at each laminated position, and bonded and integrated to form the layered body. The average number of the chopped semi prepreg sheet materials in the thickness direction was approximately 5.2.

Subsequently, as the bonding roll arranged at the downstream side of each laminated position, the heating roller with plenty of square protruding parts having 5 mm square formed on the surface was set to the heating temperature of 280 degrees, and the chopped semi prepreg sheet materials in the overlapped state were partially bonded and integrated to form the quasi-isotropic reinforced sheet material. The weight of the obtained quasi-isotropic reinforced sheet material was approximately 1030 g/m².
<Property of Quasi-Isotropic Reinforced Sheet Material>
The obtained quasi-isotropic reinforced sheet material was formed with the three layered bodies laminated, in each of which the chopped semi prepreg sheet materials with the average number in the thickness direction of approximately five were aminated. The chopped semi prepreg sheet materials having the width 5 mm and the length 30 mm were oriented randomly in the two-dimensional direction with the shape before bonding maintained as it was. No chopped semi prepreg sheet material drops off, and the quasi-isotropic reinforced sheet material was wound on the paper tube of 12 inches with the tension force applied. Here, when they were unwound from a state being wound on the paper tube of 12 inches, there were no troubles such as coming off of the chopped semi prepreg sheet material.

Embodiment 3

Using the materials described below, the quasi-isotropic reinforced sheet material was produced, and the molding product in a plate-like shape was molded using the obtained quasi-isotropic reinforced sheet material.
<Used Materials>
The same materials as those in Embodiment 1 were used.
<Production Method of Semi Prepreg Sheet Material>
Produced in a similar manner to Embodiment 1.
<Production Method of Quasi-Isotropic Reinforced Sheet Material>
Produced in a similar manner to Embodiment 2.
<Molding Method of Composite Material Molding Product Using Quasi-Isotropic Reinforced Sheet Material>
The quasi-isotropic reinforced sheet material was obtained by orientating the chopped semi prepreg sheet material having the width 5 mm and the length 30 mm randomly in the two-dimensional direction, laminating and integrating, with the partial bonding, the three layered bodies each including the chopped semi prepreg sheet materials in the average number of approximately 5.2 in the thickness direction. Three square sheet pieces having 150 mm square were chopped from the quasi-isotropic reinforced sheet material, and the chopped sheet pieces were laminated in the thickness direction to produce the laminated product. The obtained laminated product was heated and pressurized in the thickness direction at the heating temperature 280 degrees and with the pressure 2 MPa. After a molding time was set to five minutes and the PA6 resin was infiltrated among the carbon fibers to make the impregnated state, the laminated product was gradually cooled to mold a plate-like body.

The obtained plate-like molding body was molded into a square shape having 150 mm square and the thickness 2.06 mm. It was molded to have the preferable quality in a state where the orientation state of the carbon fibers in the chopped semi prepreg sheet material before bonding was maintained.
<Flow Test Method of Plate-Like Molding Body>
The plate-like piece having 75 mm square was chopped from the obtained plate-like molding body, and set in a plain-plate-like molding whose heating temperature was set to 280 degrees. After the plate-like piece was heated for three minutes by contact-pressurizing, it was pressurized for one minute with the pressure 5 MPa. Taking out the plate-like molding body obtained by heating and pressurizing, it was set in the plain-plate-like molding that was cooled to quickly cool the plate-like molding body.
<Property of Plate-Like Molding Body>
The plate-like piece having 75 mm square was molded to spread into a plate-like molding body of approximately 120 mm square. Resin flow by pressurizing was substantially uniform. Further, being checked visually, there were few parts having disturbance of orientation caused by the flow such as the meandering of the carbon fibers in the chopped semi prepreg sheet material. Therefore, a state having the preferable quality on the plate-like body was almost maintained as a whole.

Embodiment 4

Using the materials described below, the quasi-isotropic reinforced sheet material was produced, and the molding product in a plate-like shape was molded using the obtained quasi-isotropic reinforced sheet material.

<Used Material>

The same materials as those in Embodiment 1 were used.

<Production Method of Semi Prepreg Sheet Material>

Produced in a similar manner to Embodiment 1.

<Production Method of Quasi-Isotropic Reinforced Sheet Material>

Produced in a similar manner to Embodiment 2.

<Molding Method of Composite Material Molding Product Using Quasi-Isotropic Reinforced Sheet Material>

The quasi-isotropic reinforced sheet material was obtained by laminating and integrated, with partial bonding, the three layered bodies used in Embodiment 3. Three square sheet pieces having 300 mm square were chopped out, and the chopped sheet pieces were laminated in the thickness direction to produce the laminated product. The obtained laminated product was heated and pressurized in the thickness direction at the heating temperature 280 degrees and with the pressure 2 MPa. After the molding time was set to five minutes, the PA6 resin was infiltrated among the carbon fibers to make the impregnated state, the PA6 resin was gradually cooled to mold a plate-like shape body.

The obtained plate-like molding body was molded in 300 mm square and a thickness of 2.06 mm. It was molded to have the preferable quality in a state where the orientation state of the carbon fibers in the chopped semi prepreg sheet material before bonding was maintained.

<Tension Test of Plate-Like Molding Body>

A tension test was performed using five test pieces chopped out into a rectangular shape having a width 25 mm and a length 250 mm from the obtained plate-like molding body. For the tension test, a versatile material test instrument (produced by Shimadzu Corporation; AUTOGRAPH; Load Cell 100 ton) was used. Distortion of the test piece was measured by an axis stretch scale (produced by MTS Japan; length of gauge 100 mm).

<Tension Test Result of Plate-Like Molding Body>

As a result of the tension test of five test pieces, the average measurement values were; stress at rapture 445 MPa (standard variation; 35.0), distortion at rapture 1.29% (standard variation; 0.08), initial elasticity degree 35.1 GPa (standard variation; 2.63). Compared to the result of a comparison example 2 described below, both values of the stress at rapture and the distortion at rapture were high, and the standard variations were small. With the results described above, it was confirmed that the obtained plate-like molding product provides an excellent dynamic property and small unevenness of the dynamic property.

Embodiment 5

Using the materials described below, the quasi-isotropic reinforced sheet material was produced, and using the obtained quasi-isotropic reinforced sheet material, the plate-like molding product was molded.

<Used Materials>

The same materials as those in Embodiment 1 were used.

<Production Method of Semi Prepreg Sheet Material>

Produced in a similar manner to Embodiment 1.

<Production Method of Quasi-Isotropic Reinforced Sheet Material>

Using the sheet material supply mechanism and the sheet material chopping mechanism of the production apparatus illustrated in FIG. 5, the layered body of the quasi-isotropic reinforced sheet materials was produced. The obtained semi prepreg sheet material having the width 180 mm was chopped by the width 5 mm along the fiber direction, and chopped by the length 30 mm along the direction orthogonal to the fiber direction, to produce the chopped prepreg sheet material. The supply speed of the semi prepreg sheet material was set to approximately 34 m/min.

Subsequently, the obtained chopped semi prepreg sheet materials having the width 5 mm and the length 30 mm were made to naturally drop onto the conveying belt made of the metal net, and were dispersed. The conveying belt ran at a conveying speed 3 m/min, and the chopped semi prepreg sheet materials were dispersed in a range of a width 400 mm. The chopped semi prepreg sheet material was produced at the processing speed 34 m/min from the semi prepreg sheet material having the width 180 mm, and the quasi-isotropic reinforced sheet material having the width 400 mm was produced at the processing speed 3 m/min. The average number of the chopped semi prepreg sheet materials overlapped with each other on the conveying belt was approximately 5.1.

Subsequently, as a bonding roll, the heating roller with plenty of square protruding parts having 5 mm square formed on the surface was set to the heating temperature of 280 degrees, and the chopped semi prepreg sheet materials in the overlapped state were partially bonded and integrated to form the quasi-isotropic reinforced sheet material. The weight of the obtained quasi-isotropic reinforced sheet material was approximately 337 $g/m^2$.

<Molding Method of Composite Material Molding Product Using Quasi-isotropic Reinforced Sheet Material>

The chopped semi prepreg sheet material having the width 5 mm and the length 30 mm were oriented randomly in the two-dimensional direction. From the quasi-isotropic reinforced sheet material including the chopped semi prepreg sheet materials of the average number of approximately 5.1 in the thickness direction, eight square sheet pieces having 150 mm square were produced. Further, from the resin sheet material having the thickness 100 μm produced by laminating five PA6 resin films having the thickness 20 μm, seven square sheet pieces having 150 mm square were produced.

Furthermore, the laminated product was produced by alternately laminating the produced quasi-isotropic reinforced sheet material and the resin sheet materials, in order of the quasi-isotropic reinforced sheet material, the resin sheet material, the quasi-isotropic reinforced sheet material, the resin sheet material the resin sheet material, and the quasi-isotropic reinforced sheet material. The obtained laminated product was heated and pressurized in the thickness direction at the heating temperature 280 degrees and with the pressure 2 MPa. After the molding time was set to five minutes and the PA6 resin was infiltrated among the carbon fibers to make the impregnated state, the PA6 resin was gradually cooled to mold a plate-like shape body.

The obtained square plate-like molding body was molded to have 150 mm square and the thickness 2.5 mm, and it was molded to have preferable quality with the orientation state of the carbon fibers in the chopped semi prepreg sheet material maintained. Note that, although the obtained plate-like molding body used the semi prepreg sheet having the fiber volume fraction 55%, the fiber volume fraction (Vf) is to be approximately 40% by the calculation as a whole plate.

<Flow Test Method and Cross-Section Observation of Plate-Like Molding Body>

By the similar method to Embodiment 3, the flow test was performed. Further, a square plate piece having 75 mm square was chopped out from the obtained plate-like molding body, and its cross section was observed via a digital microscope (produced by KEYENCE CORPORATION; VHX-5000).

<Property of Plate-Like Molding Product>

The square plate-like piece having 75 mm square was molded in such a manner to spread into a square plate-like molding body having approximately 140 mm square, and resin flow by pressurizing was almost uniform. Further, being checked visually, there were few parts having disturbance of orientation caused by the flow such as the meandering of the carbon fibers in the chopped semi prepreg sheet material. Therefore, a state having the preferable quality on the plate-like body was almost maintained.

Furthermore, having observed the cross section of the plate-like molding body, between the layers facing the quasi-isotropic reinforced sheet material, the layer part including only the resin and the resin layer part such as the laminated resin-rich part were confirmed. It was considered that, since such resin layer parts existed, when the plate-like molding body was molded, the fluidity was improved.

Comparison Embodiment 1

Using the materials described as below, the composite material molding product was molded.

<Used Materials>

The same materials as those in Embodiment 1 were used.

<Production Method of Semi Prepreg Sheet Material>

Produced in a similar manner to Embodiment 1.

<Molding Method of Composite Material Molding Product Using Chopped Semi Prepreg Sheet Material>

The semi prepreg sheet material having the width 180 mm was chopped by the width 5 mm along the fiber direction, and chopped by the length 30 mm along the direction orthogonal to the fiber direction to produce the chopped semi prepreg sheet material.

While the chopped semi prepreg sheet materials having a weight of approximately 66 g were dispersed into the square molding having 150 mm square by natural drop, the chopped semi prepreg sheet materials were put therein at a time to produce the laminated product. The obtained laminated product was heated and pressurized at the heating temperature 280 degrees and with the pressure 2 MPa. After the molding time was set to five minutes and the PA6 resin was infiltrated among the carbon fibers to make the impregnated state, the PA6 resin was gradually cooled to be molded into a square plate-like shape body having 150 mm square and the thickness 2 mm.

<Flow Test Method of Plate-Like Molding Body>

Similarly to Embodiment 3, the obtained square plate-like piece having 75 mm square was chopped out from the obtained plate-like molding body. The plate-like piece was set in the plain-plate-like molding, whose temperature was set to 280 degrees, and the plate-like piece was contact-pressurized for three minutes to be heated and, then was pressurized for one minute with pressure 5 MPa. The plate-like molding body obtained by heating and pressurizing was taken out, and set in the cooled plain-plate-like molding to quickly cool it.

<Property of Plate-Like Molding Body>

The square plate-like piece having 75 mm square was molded in such a manner to spread in a rectangular plate-like molding body having the lateral side of approximately 130 mm and the longitudinal side of approximately 120 mm. Since resin flow by pressurizing was not uniform on the plate-like molding body and plenty of carbon fibers flowed in a direction where the resin easily flowed, the meandering of the carbon fibers due to the flow was greatly generated to cause collapse of the forms of the chopped semi prepreg sheet materials, which was visually confirmed.

Comparison Embodiment 2

Using the materials described below, the composite material molding product was molded.

<Used Materials>

The same materials as those of Embodiment 1 were used.

<Production Method of Semi Prepreg Sheet Material>

Produced in a similar manner to Embodiment 1.

<Molding Method of Composite Material Molding Product Using Chopped Semi Prepreg Sheet Material>

The semi prepreg sheet material having the width 180 mm was chopped by the width 5 mm along the fiber direction, and chopped by the length 30 mm along the direction orthogonal to the fiber direction to produce the chopped semi prepreg sheet material.

While the chopped semi prepreg sheet materials having a weight of approximately 66 g were dispersed into the square molding having 300 mm square by natural drop, the chopped semi prepreg sheet materials were put therein at a time to produce the laminated product. The obtained laminated product was heated and pressurized at the heating temperature 280 degrees and with the pressure 2 MPa. After the molding time was set to five minutes and the PA6 resin was infiltrated among the carbon fibers to make the impregnated state, the PA6 resin was gradually cooled to be molded into a square plate-like molding body having 300 mm square and the thickness 1.97 mm.

<Tension Test of Plate-Like Molding Product>

The similar tension test to Embodiment 1 was performed on the obtained plate-like molding.

<Tension Test Result of Plate-Like Molding Product>

As a result of the tension test of five test pieces, the average measurement values were; stress at rapture 320 MPa (standard variation; 94.2), distortion at rapture 0.87% (standard variation; 0.14), initial elasticity degree 38.4 GPa (standard variation; 8.09). The stress at rapture and the distortion at rapture have low values, and as indicated with the values of the standard variations, although the test pieces were taken out from the same plate-like molding body, the test results have large variation.

REFERENCE SIGNS LIST

C chopped semi prepreg sheet material
M, M1 to M3 layered body
S semi prepreg sheet material
T, T' quasi-isotropic reinforced sheet material
1 sheet material supply mechanism
2 sheet material chopping mechanism
3 chopped member conveying mechanism
4 sheet integration mechanism
5 sheet winding mechanism
6 longitudinal chopping part
7 lateral chopping part
8 to 10 distribution conveyor
11 conveying conveyor
12 conveying belt
13 to 15 bonding roll

The invention claimed is:

1. A quasi-isotropic reinforced sheet material comprising:
at least one layered body forming a continuous planar sheet, which may serve as a component of an impregnated material when impregnated by a resin to have an impregnated state,
wherein each at least one layered body comprises a plurality of chopped semi prepreg sheet materials, each said chopped semi prepreg sheet materials:
includes a reinforced fiber material and a thermoplastic resin material set in an unimpregnated state, said unimpregnated state including a part where the thermoplastic resin material is not infiltrated among the reinforced fiber materials but converged, and a resin part that is not infiltrated between the reinforced fiber materials among the thermoplastic resin materials,
has an average number of fibers in a thickness direction set in a range from two to ten and also a thickness "t" set, relative to a thickness ($t_p$) in said impregnated state, in a range of $t_p < t \leq 2 \times t_p$, and
has two outside surfaces and fiber parts are exposed on both outside surfaces, and
the plurality of chopped semi prepreg sheet materials are in a state where fiber directions of the reinforced fiber materials are oriented randomly in a two-dimensional direction,
wherein the chopped semi prepreg sheet material is chopped along fiber directions aligned by an opening operation,
wherein the plurality of chopped semi prepreg sheet materials are overlapped with each other such that the average number of the chopped semi prepreg sheet materials in the thickness direction is set in a range from two to ten, and
wherein, within the plurality of chopped semi prepreg sheet materials, a chopped semi prepreg sheet material is bonded to an adjacent chopped semi prepreg sheet material with the form in a sheet-like shape before bonding maintained as it is, so that the layered body is integrated to maintain its form in the sheet-like shape.

2. The quasi-isotropic reinforced sheet material according to claim 1, wherein the chopped semi prepreg sheet materials each have a fiber volume fraction in the impregnated state set in a range from 30% to 70%.

3. The quasi-isotropic reinforced sheet material according to claim 1, wherein the chopped semi prepreg sheet materials are partially bonded to each other by heat sealing of the thermoplastic resin material.

4. The quasi-isotropic reinforced sheet material according to claim 1, wherein a plurality of the layered bodies is laminated and integrated.

5. The quasi-isotropic reinforced sheet material according to claim 4, wherein, in the layered bodies, bonding conditions of the chopped semi prepreg sheet materials, comprising at least one of position, temperature and force, are different from each other.

6. The quasi-isotropic reinforced sheet material according to claim 4, wherein the resin layer part is formed at least partially between the adjacent layered bodies.

7. A composite material molding product comprising layers formed by heating and pressurizing a quasi-isotropic reinforced sheet material according to claim 1.

8. The composite material molding product according to claim 7, wherein the resin layer part is formed at least partially between the layers formed by heating and pressurizing a plurality of the quasi-isotropic reinforced sheet materials.

9. A roll of quasi-isotropic reinforced material of sheet-like shape, which may serve as a component of an impregnated material when impregnated by a resin to have an impregnated state, comprising:
a continuous layered body having a sheet like shape and comprising a plurality of chopped semi prepreg sheet materials,
wherein each said chopped semi prepreg sheet materials:
includes a reinforced fiber material and a thermoplastic resin material set in an unimpregnated state, said unimpregnated state including a part where the thermoplastic resin material is not infiltrated among the reinforced fiber materials but converged, and a resin part that is not infiltrated between the reinforced fiber materials among the thermoplastic resin materials,
has an average number of fibers in a thickness direction set in a range from two to ten and also a thickness "t" set, relative to a thickness ($t_p$) in said impregnated state, in a range of $t_p < t \leq 2 \times t_p$, and
has two outside surfaces and fiber parts are exposed on both outside surfaces,
wherein the plurality of chopped semi prepreg sheet materials are in a state where fiber directions of the reinforced fiber materials are oriented randomly in a two-dimensional direction,
wherein the chopped semi prepreg sheet material is chopped along fiber directions aligned by an opening operation,
wherein the plurality of chopped semi prepreg sheet materials in the continuous layered body having a sheet-like shape are overlapped with each other within the sheet-like shaped body such that the average number of the chopped semi prepreg sheet materials in the thickness direction of the sheet-like shaped body is set in a range from two to ten, and
wherein, within the plurality of chopped semi prepreg sheet materials within the sheet-like shaped body, a chopped semi prepreg sheet material is bonded to an adjacent chopped semi prepreg sheet material with the form in the sheet-like shape before bonding maintained as it is, so that the layered body is integrated to maintain its form in the sheet-like shape.

10. The quasi-isotropic reinforced sheet material according to claim 1, wherein said continuous planar sheet has a length sufficient for the sheet to be wound in a roll.

11. The quasi-isotropic reinforced sheet material according to claim 1, wherein said continuous planar sheet is a laminate of at least two layered bodies.

12. The quasi-isotropic reinforced sheet material according to claim 11, wherein said continuous planar sheet comprises a plurality of layered bodies integrated together and forming a continuous laminated planar sheet.

13. The quasi-isotropic reinforced sheet material according to claim 1, wherein said continuous planar sheet comprises a plurality of layered bodies integrated together and forming a continuous laminated planar sheet.

* * * * *